[11] 3,571,748

| [72] | Inventors | Charles J. Koester<br>Firecrest Lane, Sudbury, Mass. 01776;<br>Elias Snitzer, 177 Hampshire Road,<br>Wellesley, Mass. 02181 |
|---|---|---|
| [21] | Appl. No. | 718,822 |
| [22] | Filed | Apr. 4, 1968 |
| [45] | Patented | Mar. 23, 1971<br>Continuation of application Ser. No.<br>265,033, Feb. 4, 1963, now abandoned,<br>which is a Division of Ser. No. 108,020,<br>May 5, 1961, abandoned |

[54] METHOD AND APPARATUS FOR DIRECTING OUTPUT OF OPTICAL MASERS
18 Claims, 7 Drawing Figs.

[52] U.S. Cl............................................. 331/94.5, 356/138
[51] Int. Cl............................................. H01s 3/00, G01b 11/26, G01c 1/00
[50] Field of Search............................................. 331/94.5, 138

[56] References Cited
UNITED STATES PATENTS

| 2,775,158 | 12/1956 | Mitchell | 356/138 |
| 3,096,767 | 7/1963 | Gresser et al. | 128/395 |
| 3,432,240 | 3/1969 | Jackson | 356/72-X |
| 3,467,474 | 9/1969 | Shifrin | 331/94.5-X |

*Primary Examiner*—Ronald L. Wibert
*Assistant Examiner*—Warren A. Sklar
*Attorneys*—J. Albert Hultquist and Noble S. Williams

ABSTRACT: Aiming apparatus for an optical maser. Low-intensity light is projected toward the optical maser and its direction is adjusted so that the light is perpendicular to the end face of the optical maser form which the radiant energy is emitted, i.e., the low-intensity light is transmitted along the optical axis subsequently followed by the beam of radiant energy from the optical maser. The low-intensity light is then aimed at a target as desired by adjustment of an optical system. The subsequently emitted beam of radiant energy follows the same path toward the target. The high-intensity beam of radiant energy is thus properly aimed before firing.

PATENTED MAR 23 1971 3,571,748

INVENTORS
CHARLES J. KOESTER
ELIAS SNITZER
BY Amster & Rothstein
ATTORNEYS

INVENTORS
CHARLES J. KOESTER
ELIAS SNITZER
BY Auslek & Rothstein
ATTORNEYS

METHOD AND APPARATUS FOR DIRECTING OUTPUT OF OPTICAL MASERS

This application is a continuation of our application Ser. No. 256,033, filed Feb. 4, 1963, which application comprises a division of our copending application Ser. No. 108,020, filed May 5, 1961, the latter having now been abandoned and replaced by our continuing, copending application Ser. No. 318,456, filed Oct. 23, 1963.

The field of this invention is that of photocoagulation of the human eye, and the invention relates, more particularly, to novel and improved methods and apparatus for effecting such photocoagulation.

The process called photocoagulation has been developed principally to achieve fusion of the retina and choroid of an eye to overcome retinal detachments which may have resulted from various causes, but the process can also be utilized in many different ways which are well known to the medical profession. As applied to chorioretinal coagulation, the process essentially comprises the application of radiant energy to the cornea of an eye during pupillary dilation, the energy being directed upon the eye in such a manner that it is concentrated at a selected point upon the fundus by refractive media of the eye and is adapted to fuse or congeal tissues of the eye within a narrowly localized fundus area. Since the refractive media of the eye may be injured or impaired by ultraviolet radiations, and since radiant energy directed upon the fundus may be rapidly dissipated or conducted into surrounding portions of the eye, particularly by blood vessels in the choroid and by the pigment epithelium, radiant energy is preferably applied to the eye in the form of light within the visible spectrum and is applied at sufficiently high intensity for accomplishing the desired degree of chorioretinal coagulation or the like within a very short period of time before portions of the eye outside the area to be coagulated are heated to an excessive degree. It should also be noted that photocoagulation of eye tissues sufficient to result in permanent attachment of the retina to the choroid, for example, requires destruction of the visual receptors in the coagulated area so that the area of coagulation must be precisely positioned and narrowly circumscribed in the location most advantageously effecting such retinal attachment or the like whether that location is within a macular or peripheral fundus area. Conventional photocoagulation apparatus incorporate light sources which have not been entirely satisfactory for providing radiant energy in the desired form and intensity without undesirable power losses and without the excessive generation of heat resulting from such power losses and generally require relatively complex systems for directing light from said sources upon selected fundus areas of an eye.

It is an object of this invention to provide photocoagulation apparatus which is of relatively simple, compact and economical construction; to provide a photocoagulation apparatus which is adapted to provide radiant energy in the desired form and intensity without excessive power loss and without the excessive generation of heat resulting from such power loss; and to provide a photocoagulation apparatus which can be conveniently and accurately adjusted to effect a precisely located and narrowly circumscribed retinal fusion or the like.

It is a further object of this invention to provide a photocoagulation apparatus comprising optical maser or laser means adapted to project extremely intense light, and means adapted to direct said light upon an eye so that said light is focused upon a relatively small fundus area by refractive media of the eye for effecting photocoagulation of said fundus area; and to provide such apparatus comprising laser means adapted to project extremely intense, collimated, monochromatic light, and means adapted to reflect said light upon and eye so that said light is concentrated upon a relatively small fundus area by refractive media of the eye for effecting photocoagulation of said fundus area.

A further object of this invention is to provide novel and improved methods for effecting photocoagulation; to provide novel and improved methods for achieving a chorioretinal fusion or the like within a precisely located and narrowly circumscribed area; and to provide such methods for effecting photocoagulation which can be conveniently and accurately performed.

An additional object of this invention is to provide photocoagulation apparatus incorporating means adapted to conveniently and accurately focus radiant energy upon a selected fundus area for effecting photocoagulation of said fundus area; to provide such apparatus including optical maser or laser means which are actuable to project extremely intense, collimated, monochromatic light, means adapted to direct said light upon an eye so that said light is concentrated upon a relatively small fundus area by refractive media of the eye for effecting photocoagulation of said fundus area, and means adapted to focus said light-directing means for directing said radiant energy upon a selected fundus area before said laser means are actuated.

Another object is to provide such photocoagulation apparatus which permits a relatively large fundus area to be illuminated and observed during positioning of the apparatus relative to an eye and which is adapted to clearly indicate the fundus area to be coagulated before coagulation is effected by the apparatus.

Other objects, advantages and details of the photocoagulation apparatus and of the methods for effecting photocoagulation provided by this invention will appear in the following detailed description of preferred embodiments of the methods and apparatus of this invention, the detailed description referring to the drawings in which.

Figure 1:
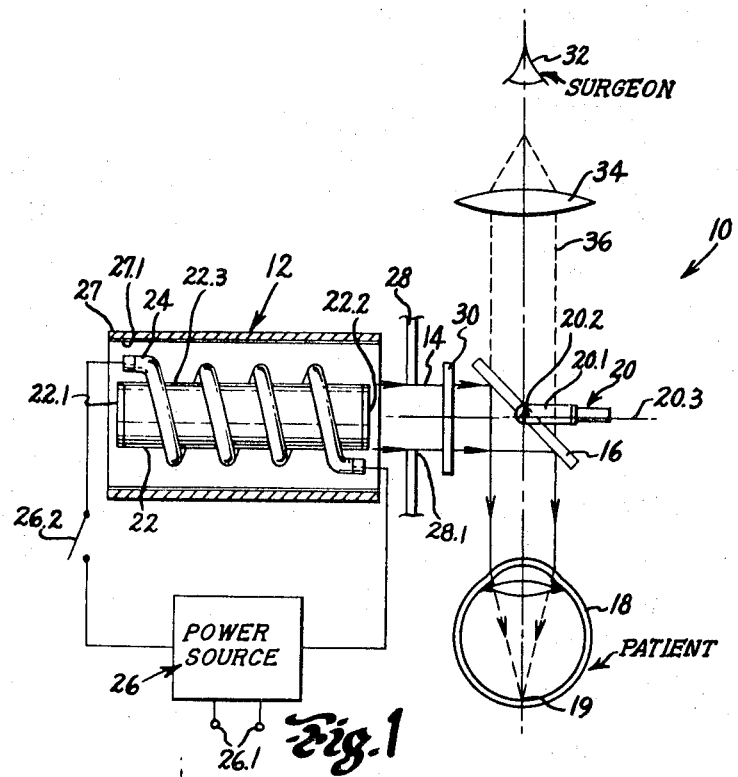
FIG. 1 is a partial diagrammatic plan view of the apparatus of this invention illustrating the basic method and apparatus elements provided by this invention for effecting photocoagulation.

Referring to the drawings, FIG. 1 illustrates the basic source of radiant energy and the preferred energy-directing means incorporated in the photocoagulation apparatus contemplated by this invention. As shown, the basic energy source comprises a conventional optical maser means 12 which is adapted to project collimated radiant energy in the direction indicated by the arrowheaded lines 14. The energy-directing means of the apparatus preferably comprises a reflector means 16 by which said collimated radiant energy can be directed upon an eye 18 in such a manner that the energy is concentrated upon a selected fundus area 19 by refractive media of the eye for rapidly heating said fundus area to a temperature sufficient to effect photocoagulation of the area. The optical maser means 12 and the reflector 16 are preferably but not necessarily, mounted upon a common carrier of a suitable type (not shown), and the reflector is preferably supported between bifurcations 20.1 of a fork 20 or by other conventional means for rotation about an axis indicated by the pivot pin 20.2 and for rotation about an axis 20.3, whereby the reflector can be disposed at a selected angular orientation in space to intercept the radiant energy output of the maser means at a selected angle of incidence to conveniently reflect said energy upon an eye to be concentrated upon any selected area of the fundus of the eye including both macular and peripheral fundus area.

Various maser means can be utilized as a source of radiant energy within the scope of this invention, but preferably the energy source comprises a conventional solid optical maser, commonly called a laser, which is adapted to provide radiant energy in the form of visible light. Such a laser can embody a cylindrical rod 22 of a suitable laser material having end faces 22.1 and 22.2 which preferably extend normal to the rod axis and which are preferably silvered or otherwise adapted to reflect light, the rod end surface 22.2 being partially-reflecting and partially-transmitting in conventional manner. The laser can also include a light source 24 which is adapted to direct a substantial amount of radiant energy into the rod through the rod periphery 22.3, and a power supply means 26 of any conventional type can be provided for energizing the light source 24 when required.

For example, the rod 22 can be comprised of a ruby material and can be of approximately 5 millimeters diameter. The light source 24 can comprise a high-pressure, xenon-vapor, arc-type flash tube such as the tube sold by the General Electric Company of Schenectady, N.Y. under the designation GE–FT 524, the tube being coiled around the periphery of the rod 22. Preferably a cylindrical reflector 27 having an inner reflecting surface 27.1, shown in axial section in FIG. 1, can be fitted around the light source 24 and the rod 22 for increasing the light from the source which is directed into the rod through the rod periphery. Such a flash tube can be fired to emit a relatively intense light by a power supply 26 embodying one or more condensers of appropriate capacity, the condensers being adapted to be charged through a conventional circuit represented in FIG. 1 by the terminals 26.1 and being adapted to be discharged through the flash tube 24 by closing of the switch means 26.2 in conventional manner. If the light source 24 selected for embodiment in the apparatus of this invention is provided with an energizing electrode or other auxiliary means for initiating energization of the source, as is the suggested flash tube GE–FT 524, the light source can also be arranged in a conventional energizing circuit (not show).

Upon firing of the flash tube 24, the described optical laser means 12 can be adapted to project a burst of very intense, substantially monochromatic light, for example, light of 6930 Angstrom units wavelength, the light being emitted in a perpendicular direction from the surface 22.2 in the form of a plane wave. Light emitted from the surface 22.2 can be collimated to within approximately 1° and can be reflected upon the cornea of an eye 18 by the reflector 16 that the light can be transmitted through the pupil of the eye and can be concentrated upon a selected area of the fundus by refractive media of the eye. Where the rod 22 has a diameter of 5 millimeters as suggested, the beam of collimated light emitted from the rod surface 22.2 will have a cross section of corresponding diameter and can be conveniently directed through the dilated pupil of the eye 18. However, where the diameter of the rod 22 does not correspond to the diameter of the dilated eye pupil, a diaphragm or screen 28 having an aperture 28.1 of adjustable diameter can be interposed in the path of the light output of the laser means 12 for determining the diameter of the cornea of the eye 18 upon which the laser output can impinge as will be understood. Alternatively, an afocal telescope system or other conventional means can be interposed between the laser rod surface 22.2 and the eye 18 for determining the cross-sectional diameter of the light beam directed upon the eye in conventional manner. Filter means 30 of any conventional type can also be selectively interposed in the path of the light output of the laser means 12 for regulating the intensity of the light directed upon the eye 18 in well-known manner.

Since light output of a laser means 12 as above-described can be substantially monochromatic, the laser means can be adapted to direct visible light within an eye 18 for effecting a desired chorioretinal fusion or the like without exposing refractive media of the eye to the harmful effects of any significant amount of ultraviolet radiation. Further, since the light output of the laser means is substantially collimated, collimated light can be directed upon the cornea of the eye 18 be a simple reflector 16 and will thereby be adapted to be concentrated upon a selected fundus area by the refractive media of the eye. In addition, since the light output of the laser means 12 can comprise a plane wave, the light can be concentrated upon a very narrowly restricted area of the fundus by the refractive media of the eye, thereby to effect a chorioretinal fusion for example, without destroying visual receptors over a larger area of the retina than is absolutely necessary. Further, since the light output of the laser means 12 can be very intense, the photocoagulation apparatus incorporating the laser means 12 can effect chorioretinal fusions or the like within a mere instant of time, thereby achieving said fusion without tending to overheat adjacent parts of the eye. Finally, since light output of the laser means 12 can be very intense, the light output can be partially subdued by filter means or the like such as the filter 30 to permit convenient and accurate regulation or selection of the degree to which a fundus area can be fused or coagulated.

If desired, the reflector means 16 embodied in the photocoagulation apparatus can comprise a partially-transmitting mirror of convenional type, whereby an operator of the apparatus can view the fundus of the eye 18 through the mirror prior to photocoagulation of a fundus area. For example, the apparatus operator diagrammatically indicated at 32 can utilize a conventional ophthalmoscope as indicated by the lens 34 for viewing the fundus of the eye 18 along the line of sight through the mirror 16 as indicated by the broken lines 36 in FIG. 1. The operator can also direct light through the reflector for illuminating the entire area of the fundus prior to coagulation of a fundus area. Preferably the reflector means 16 is adapted for relatively high reflectance of light of at least the wavelength projected by the laser means 12, thereby to direct a substantial part of the energy output of the laser means upon the eye 18.

It will be understood that radiant energy of intensity sufficient to fuse and destroy eye tissues within an instant of time as described above cannot be permitted to impinge upon a fundus area or other area of the eye where photocoagulation is not desired. For this reason, the laser means and energy-directing means incorporated in a photocoagulation apparatus should be adapted for adjustment relative to an eye so that energy output of the laser means is aimed at the proper fundus area before the laser means is fired to provide said radiant energy. In this regard it will be noted that a conventional optical maser or laser includes a pair of plane, parallel, reflective end surfaces, one of which functions as the output end of the laser, and that energy output of the laser will be collimated and will be projected in a direction normal to the plane of said output end surface in well-known manner. In the illustrated laser means 12, this energy-emitting surface is the end surface 22.2 of the laser rod 22 as will be understood. According to the method provided by this invention for effecting photocoagulation of the human eye, light from a secondary source is first directed upon an end surface of a laser in a direction normal or perpendicular to said end surface so that said light is directed along a path parallel to the path of the light output of the laser means. For example, light can be directed upon the output end surface of the laser means in a direction perpendicular to said surface, whereby said light will also be reflected from said end surface in a direction normal to the surface in such a manner that the reflected light will correspond in direction to regular light output of the laser. This reflected light can then be considered as representative of the laser output so that the energy-directing means of the apparatus such as the reflector 16 can be adjusted relative to an eye until said reflected light is concentrated by refractive media of the eye upon a selected fundus area in which photocoagulation is to be effected. Then, the apparatus laser can be fired in the manner described with reference to FIG. 1 for projecting collimated light of very high intensity. This intense light will follow the path of the reflected light previously focused on the eye and will also be concentrated upon the selected fundus area to effect coagulation of said fundus area. Alternatively, a beam of collimated light can be directed toward the end surface of the laser which is opposite the output end surface thereof in a direction normal to said surface, part of said light being intercepted by said opposite end surface and part of said light being directed past the laser. The light intercepted by said opposite end surface can serve to indicate that light directed upon said surface can serve to indicate that light directed upon said surface is directed normal to the surface whereby light directed around the laser rod can be understood to be directed along a path corresponding to the regular light output of the laser means. This light directed past the laser can then be focused upon a selected area of the fundus of an eye in the manner described above with reference to light reflected from the output end surface of the laser means thereby to aim the laser means so that subsequent light output of the laser means will also be focused or concentrated upon the selected fundus area.

Figure 2:
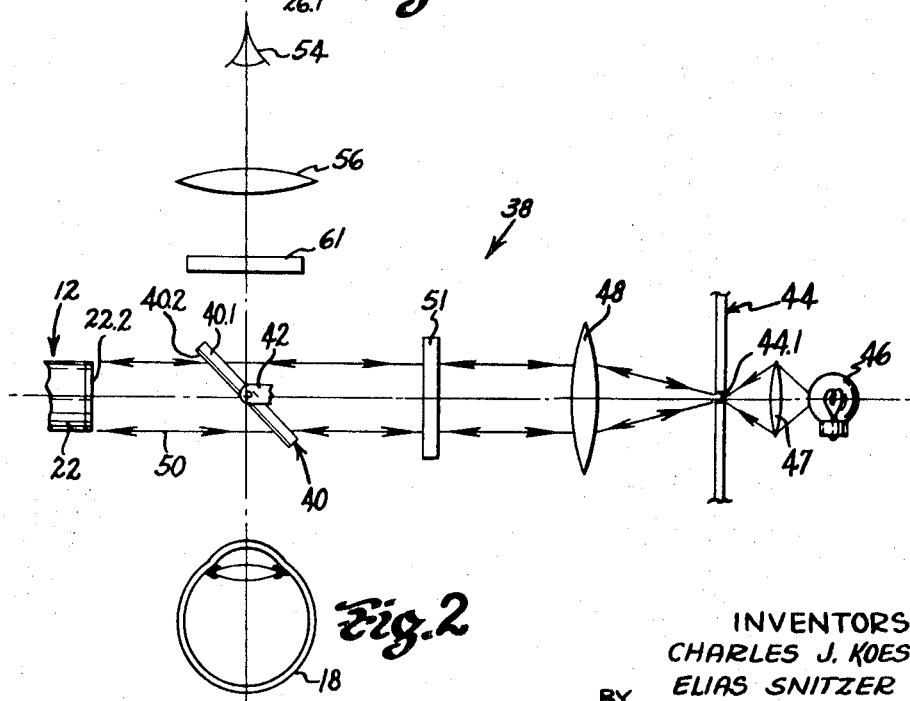
FIGS. 2, 3 and 4 are diagrammatic plan views showing an alternative embodiment of the method and apparatus provided by this invention for effecting photocoagulation, each of said views illustrating separate functions of components of the apparatus.
Figure 3:
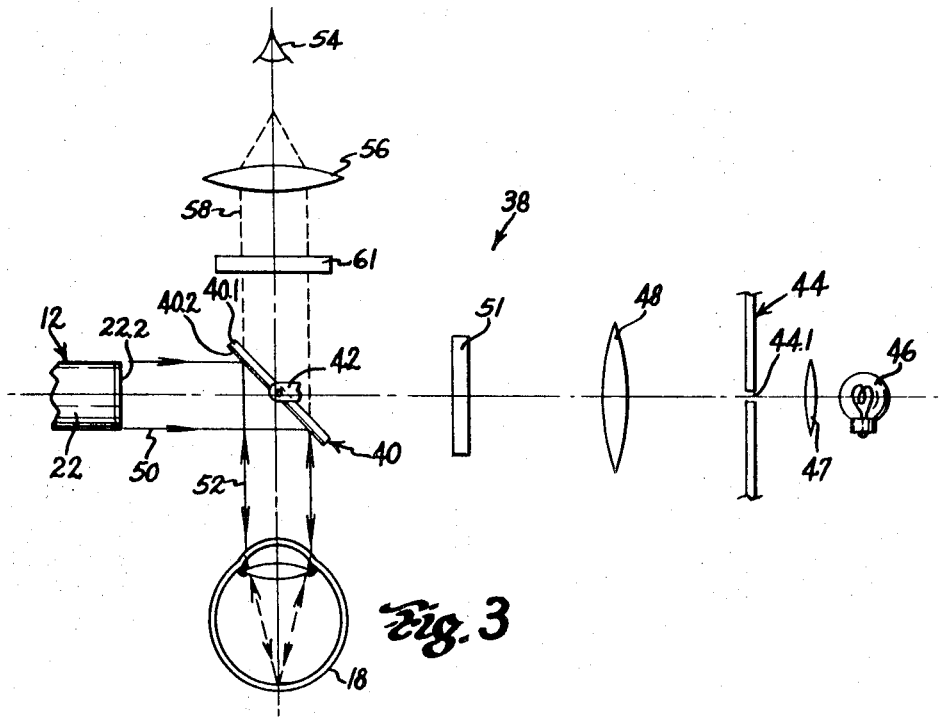
Figure 4:
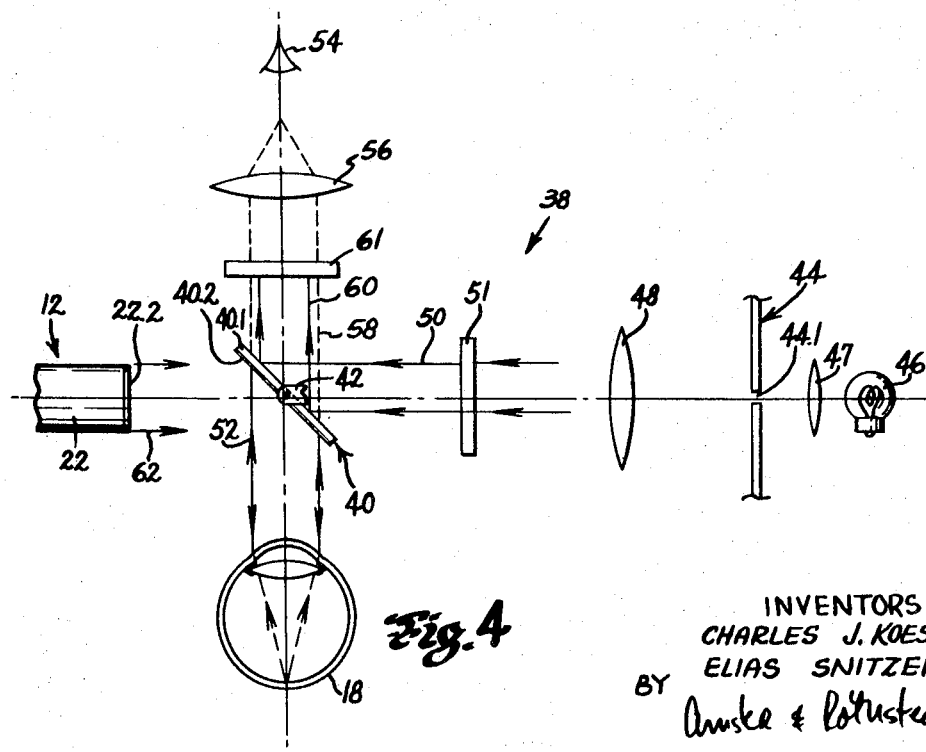

A preferred apparatus 38 provided by this invention for accomplishing photocoagulation in the manner above-described is illustrated in FIGS. 2, 3 and 4, said drawing FIGS. comprising substantially identical diagrammatic views of the preferred apparatus which, for the purpose of clarity, separately illustrate the functions of respective apparatus components or features. The apparatus 38 includes or can include all components of the apparatus described with reference to FIG. 1 but particularly includes an optical maser or laser means 12, complete with power supply and the like, having a rod 22 for example which is plated as at 22..2 to be partially light-transmitting and partially-reflecting as described above, only a small part of the laser means 12 including the energy emitting surface 22.2 being shown for convenience of illustration.

In this apparatus, a reflector means or dichroic mirror 40 is preferably substituted for the reflector 16 previously described. This mirror is preferably mounted upon a fork support 42 or the like similar to the support 20 previously described, and is thereby adapted to be rotated about two axes for directing light output of the laser means 12 upon a selected area of the fundus of an eye 18. Preferably the reflector 40 includes a support or backing member 40.1 of glass or the like which is adapted for high absorption of light of the wavelength projected by the laser means 12 and for high transmittance of light of other wavelengths. Preferably also the backing member 40.1 is plated with a thin, partially-transmitting and partially-reflecting metallic coating as at 40.2, the coating material preferably comprising a material adapted for relatively high reflectance of light of the wavelength projected by the laser means and for relatively high transmittance of light of other wavelengths. For example, where the output of the laser means 12 comprises light of 6930 Angstrom units wavelength as suggested in the previous example, the backing member 40.1 can embody a plate of light flint crown glass or other filter material having a relatively narrow absorption band adapted for relatively high absorption of red light of the noted wavelength, and the coating 40.2 on the backing member can comprise a thin gold plating or other well-known dichroic film adapted for relatively high transmission of light at the green side of the spectrum and for relatively high reflectance of light at the red side of the spectrum. The advantage in providing a partially-transmitting mirror 40 of the particular character described will be more fully explained below.

The apparatus 38 also includes a secondary light source which preferably is of the type which can be considered as a point source of light. For example, a diaphragm or screen member 44 having a pinhole aperture 44.1 can be provided, and a filament lamp 46 or the like can be arranged to illuminate the screen aperture so that the aperture functions as a point source of light in well-known manner. If desired, a lens means 47 can be disposed between the lamp 46 and the aperture 44.1 for imaging the lamp filament on the aperture, thereby to assure adequate illumination of the aperture. Alternatively, an arc-type of lamp having a small arc which can function as a point source of light can be employed as a secondary light source.

A collimating lens or lens system as indicated at 48 is then interposed between the point light source formed by the aperture 44.1 and the output end surface 22.2 of the laser means 12, the light source means and the collimating lens preferably being movably mounted with the mirror 40 and with the laser means 12 upon a common carrier of a conventional type (not shown), whereby the lens and light source can be adjusted in position relative to the end surface 22.2 of the laser means. The lens 48 can then be adjusted to direct a collimated beam of light from the source 44.1 upon the mirror 40 so that light transmitted through the partially-reflecting mirror can be perpendicularly incident upon the laser end surface 22.2 and can also be reflected from the surface in a direction perpendicular thereto as indicated by the arrowheaded lines 50. The lines 50 and other lines herein having double arrowheads pointing in opposite directions indicate that light is transmitted along the lines in the direction indicated by each arrowhead according to this invention. A light polarizer 51 of conventional type can be interposed between the collimating lens 48 and the mirror 40, if desired, for a purpose which will hereinafter be explained. Since light reflected from the face 22.2, particularly light at the green side of the spectrum, will be partially transmitted back through the mirror 40, as indicated in FIG. 2 by the double arrowheaded lines 50, and will be refocused upon the screen 44 by the lens 48, the lens 48 and the light source formed by the aperture 44.1 can be adjusted relative to the laser surface 22.2 until the reflected light refocused by the lens 48 is concentrated upon the screen aperture 44.1, thereby to assure that the collimated light incident upon and reflected from the laser surface 22.2 is directed substantially perpendicular to the face in the desired manner as will be understood. It will be noted that light from the point source 44.1 can be reflected from the surface 22.2 in a perpendicular direction to be refocused upon the aperture 44.1 regardless of the angle at which the partially reflecting mirror 40 is disposed, but the mirror is preferably disposed at an angle oblique to light from the lamp 46 so that light reflected directly from the mirror will be directed away from the eye 18 and will not be refocused by the lens 48 and will therefore not interfere with refocusing of light reflected back from the surface 22.2.

Since light subsequently propagated by the laser means 12 will be emitted in a direction perpendicular to the face 22.2 as previously noted, light from the lamp 46 which is reflected from the face 22.2 in a perpendicular direction can be considered as representative of the laser light output. It can be seen by reference to FIG. 3 that part of the light 50 reflected back from face 22.2 onto the mirror 40, particularly light at the red side of the spectrum, will be reflected from the mirror toward the eye 18 as indicated by the arrowheaded lines 52. Thus the mirror 40 can be adjusted for directing this reflected light upon a selected area of the fundus of an eye in the manner described with reference to FIG. 1, whereby the mirror will also be positioned for focusing subsequent light output from the laser means 12 upon said selected fundus area as will be understood. During focusing of the reflected light upon the fundus, the operator of the apparatus 38, indicated at 54, can view the fundus through the partially-transmitting mirror 40 be means of a conventional indirect ophthalmoscope, the lines of which is shown at 56, or similar means as indicated in FIG. 3 by the broken lines 58. The operator of the apparatus 38 can also direct light through the mirror 40 by means of an ophthalmoscope, for example, for illuminating and observing a substantial fundus area while the light reflected from the surface 22.2 is focused upon a selected fundus area. This reflected light will be focused as a bright spot on the fundus clearly indicating the spot upon which the laser means is adapted to direct light of coagulating intensity.

It has been noted above that part of the light 50 from the secondary source 44.1 which is collimated by the lens 48 and directed toward the laser end face 22.2 will be transmitted through the partially-transmitting mirror 40 to be reflected from the laser end face as above-described. The remaining part of said light will be reflected from the mirror 40 in the manner indicated by the arrowhead lines 60 in FIG. 4. This light is, of course, directed toward the eye of the operator of the apparatus 38 and would tend to interfere with viewing of the fundus of the eye 18 through the mirror 40. Thus, according to this invention, the light polarizer 51 is preferably interposed between the collimating lens 48 and the mirror 40, as previously noted, and is adapted to plane polarize light from the source 44.1, preferably in a direction parallel to the plane of the drawing as illustrated in FIG. 4. Another polarizer 61 crossed with respect to the polarizer 51 can then be interposed between the mirror 40 and the eye of the apparatus operator 54, whereby light collimated by the lens 48 and reflected directly from the mirror 40 can be completely extinguished or masked from the operator's eye as will be understood. Light directed upon and reflected from the fundus of the eye 18 during focusing of the reflector 40 will be diffused or depolarized in being reflected from the irregular fundus surface even though said light has been initially polarized in one direction in being directed through the polarizer 51. Thus this depolarized and reflected light will be transmitted through the mirror 40 and through the other polarizer 61 as indicated in FIG. 4 by the broken lines 58 to permit observation of the fundus during focusing of the apparatus 38.

After directing light reflected from the laser end face 22.2 upon the fundus of the eye 18, the laser means 12 can be fired in the manner described with reference to FIG. 1 for directing intense light from the laser toward the mirror 40 as indicated by the arrowheaded lines 62 in FIG. 4, thereby to reflect said light from the mirror 40 to be concentrated upon a selected fundus area for effecting photocoagulation of said fundus area. It will be understood, however, that part of the intense light from the laser which is directed upon the mirror 40 would tend to pass through the partially-transmitting mirror to be concentrated by the lens 48 upon the screen aperture 44.1, and would be likely to burn out the lamp 46. However, where the mirror 40 has the particular characteristics previously described, damage to the lamp 46 can be conveniently avoided. Thus, where the reflective surface 40.2 of the mirror is adapted to be highly reflective for light of the particular wavelength emitted by the laser means 12, only a relatively small part of the energy output of the laser means will be transmitted through said reflective surface. Further, where the backing member 40.1 of the mirror is formed of a material adapted for high absorption of light of said particular wavelength as described, little or no light energy from the laser means will be transmitted through the mirror 40 to be concentrated by the lens 48.

It can be seen that the apparatus 38 above-described can be conveniently focused upon a selected fundus area and can then be fired to effect photocoagulation of the area. It can also be seen that the apparatus 38 required for this purpose is of relatively simple, compact and inexpensive construction.

It should be understood that although the apparatus 38 has been described with particular reference to effecting a chorioretinal fusion or the like and has been described as employing the refractive media of the eye for concentrating light reflected toward the eye 18 from the mirror 40, the apparatus 38 could be conveniently adapted to effect photocoagulation of other portions of the eye. For example, a lens system of any conventional type could be interposed between the mirror 40 and the eye 18 and could be adapted to concentrate laser output energy upon the iris of the eye or upon any other part of the eye which is exposed to view within the scope of this invention.

Figure 5:
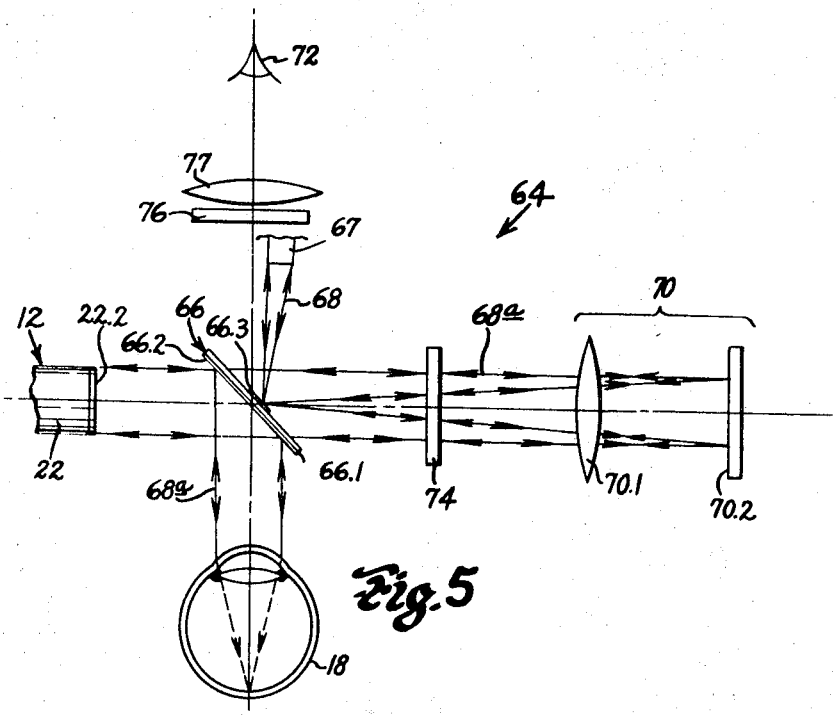
FIGS. 5 and 6 are diagrammatic plan views showing another alternative embodiment of the apparatus provided by this invention for effecting photocoagulation, each of said views illustrating separate functions of components of the apparatus.
Figure 6:
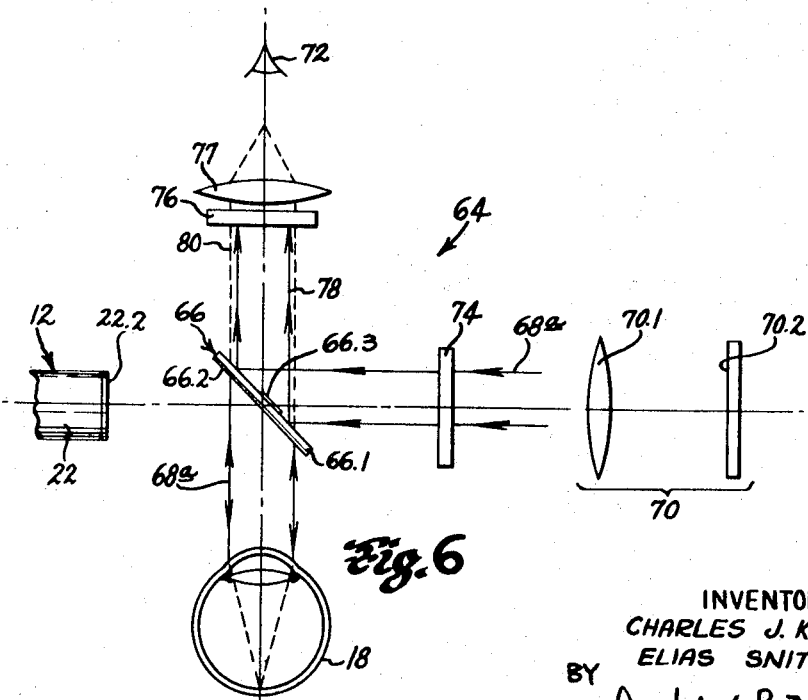

Another alternative embodiment 64 of the apparatus of this invention is illustrated in FIGS. 5 and 6, this latter apparatus being slightly less convenient to operate but requiring correspondingly less complex apparatus for accomplishing the desired purpose. The apparatus 64, like the apparatus 38, can include substantially all components of the apparatus described with reference to FIG. 1 but particularly includes a laser means 12. Only a small part of the laser means 12, including the energy-emitting laser surface 22.2 is shown for convenience of illustration. The apparatus 64 can also include a partially-transmitting mirror 66 which has a backing member 66.1 and a reflective surface 66.2 of materials which are selected with regard to the wavelength of the light output of the laser means 12 in the manner described with reference to the mirror 40 shown in FIGS. 2, 3, and 4. The mirror 66 is preferably also mounted for rotation about two axes in the manner of the mirror 40 so that the mirror 66 is adapted to direct light output of the laser means 12 upon the cornea of an eye 18 to be concentrated upon a selected fundus area of the eye. In addition, the mirror 66 has a very small silvered spot or coating 66.3 on the surface of the backing member 66.1 opposite the reflective surface 66.2, this silvered spot preferably, but not necessarily, being located for convenience of adjustment at the center of the mirror or at the intersection of the two axes about which the mirror is adapted to be rotated. By use of a secondary light source such as the illuminator of a conventional ophthalmoscope, indicated at 67, light can be directed upon the silvered spot 66.3 as indicated by the arrowheaded lines 68 in FIG. 5, whereby the silvered spot can function as point source of light.

A light-collimating system 70 can be arranged to intercept light from the secondary source, that is, light reflected from the silvered spot 66.3, and can be adapted to direct a collimated beam of light through the partially-transmitting mirror 66 to be perpendicularly incident upon the face 22.2 of the laser means 12 incorporated in the apparatus. For example, a lens 70.1 can be adapted to partially collimate light reflected from the silvered spot 66.3 and to reflect said partially collimated light back through the lens from a mirror 70.2 for fully collimating the light in well-known manner as shown by the arrowheaded lines 68a in FIG. 5. Preferably, the light-collimating system 70 is movably mounted with the mirror 66 and with the laser means 12 upon a common carrier (not shown) and is adapted to be adjusted relative to said mirror and laser means so that part of the collimated light provided by the system 70 can be directed through the mirror 66 to be incident upon and reflected from the plane surface 22.2 of the laser means 12. Light reflected back from the face 22.2, particularly light at the green side of the spectrum, will also be partially transmitted through the mirror 66 and through the system 70 to be decollimated by the system and to be refocused upon the mirror 66. Thus, the system 70 can be adjusted relative to the laser end face 22.2 and to the silvered spot 66.3 until reflected light decollimated by the system 70 is refocused upon the silvered spot 66.3 as shown in FIG. 5, whereby the operator of the apparatus can be assured that the light incident upon and reflected from the laser end face 22.2 is directed substantially perpendicular to the face 22.2 in the desired manner.

Although part of the light reflected from the laser end face 22.2 is transmitted back through the mirror 66 to be refocused upon the silvered spot 66.3, the remaining part of said reflected light, particularly the reflected light at the red side of the spectrum, will be reflected by the mirror surface 66.2 upon the eye 18, whereby the mirror 66 can be adjusted to direct said light upon a selected fundus area. This reflected light can then be considered as representative of the laser light output as described with reference to the apparatus 38 so that when said reflected light is focused upon a selected fundus area, the laser means can be fired in the manner previously described for also directing the energy propagated by the laser upon said selected fundus area. It will be noted that during focusing of the light reflected from the laser end face 22.2 upon the fundus of the eye 18, movement of the mirror 66 to adjust reflection from the mirror surface 66.2 upon a selected fundus area also adjusts the angle of reflection from the silvered spot 66.3 of the mirror and will affect the previous adjustment of the collimating system 70 by which collimated light is directed upon the laser end face 22.2. However, the angle at which light from the ophthalmoscope 67 is directed upon the silvered spot 66.3 can also be readily adjusted so that light reflected from the silvered spot can still be directed toward the laser end surface 22.2 in a direction perpendicular to the surface as described.

It will be noted that part of the collimated light provided by the system 70 will be reflected from the mirror 66 toward the eye 72 of the operator of the apparatus 64. Thus complementary light polarizers 74 and 76 are preferably incorporated in the apparatus in a manner similar to that in which polarizers 51 and 61 are employed in the apparatus 38 previously described for masking or extinguishing said light as indicated in FIG. 6 by the arrowheaded lines 78. The polarizer 74 can comprise a conventional one-fourth wave plate which is oriented with its optic axis at any selected angle relative to the path of light reflected from the silvered spot 66.3 of the mirror 66. Light transmitted through the one-fourth wave plate toward the mirror surface 70.2 and then reflected back through the plate from the surface 70.2 will be plane polarized as will be understood. This plane polarized light indicated by the arrowheaded lines 68a will then be partially transmitted through the mirror 66 to be focused on the eye 18 as above-described and will be partially reflected toward the eye 72 of the apparatus operator. The part of this light which is reflected toward the eye of the apparatus operator as indicated by the arrowheaded lines 78 can be intercepted by the polarizer 76, this polarizer being crossed with respect to the plane of polarization of said light for completely extinguishing this light. The apparatus operator can observe the fundus of the eye 18 with an ophthalmoscope 77 by means of depolarized light reflected from the fundus along the line of sight indicated in FIG. 6 by the broken lines 80 in the manner also previously described.

Figure 7:
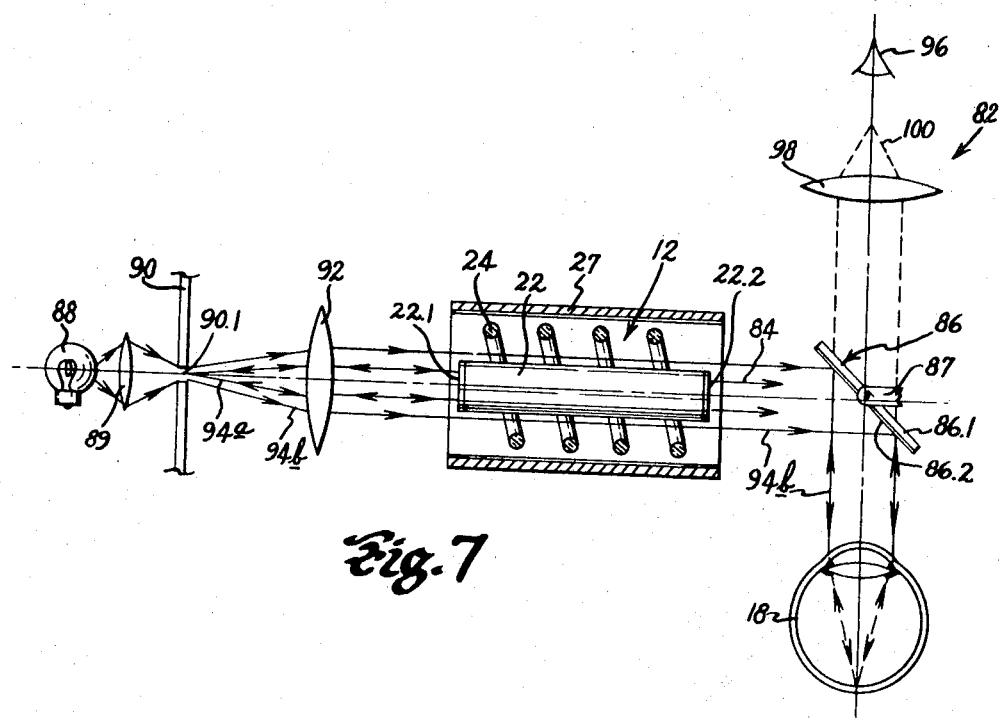
FIG. 7 is a diagrammatic plan view showing another alternative embodiment of the apparatus provided by this invention.

Another alternative embodiment 82 of the apparatus of this invention is illustrated in FIG. 7. The apparatus 82 like the apparatus 38 and 64 can include all components of the laser means 12 previously described with reference to FIG. 1, only a part of the laser means being shown in FIG. 7 for convenience of illustration. As illustrated, the laser means 12 includes a laser rod 22 having a pair of plane, parallel, opposite end surfaces 22.1 and 22.2 one of which, the surface 22.2, is adapted to emit relatively intense, collimated light of substantially a single wavelength in a direction perpendicular to the surface as indicated in FIG. 7 by the arrowheaded lines 84. The apparatus 82 preferably also includes a partially-reflecting mirror 86 which has a backing member 86.1 and a reflective surface 86.2 of materials which are selected with regard to the wavelength of the light output of the laser means 12 in the manner described with reference to the mirrors 40 and 66 in the apparatus 38 and 64. The mirror 86 is preferably mounted upon a fork 87 or other similar support for rotation about two axes in the manner of the mirrors 40 and 66 so that the mirror can be rotated to intercept light output of the laser means at a selected angle of incidence and to direct said light upon the cornea of an eye 18 to be concentrated upon a selected fundus area by refractive media of the eye.

In this embodiment of the invention, the filament of a lamp 88 is adapted to be imaged upon an aperture 90.1 of a screen or diaphragm 90 by a lens 89 so that the aperture can form a point source of light in conventional manner. Of course, any other similar means for providing a point source of light is within the scope of this invention. A collimating means of any conventional type as indicated by the lens 92 is then adapted to collimate light from the source 90.1 directed through the diaphragm aperture 90.1 and to direct a beam of said light toward the plane laser surface 22.1 which is opposite the output end surface 22.2 of the laser means 12, this light being directed so that part of the light is incident upon and reflected from the surface 22.1 in a direction perpendicular to said surface as indicated in FIG. 7 by the arrowheaded lines 94a. The remaining part of the light collimated by the lens 92 is directed past the laser rod 22, preferably around substantially all peripheral portions of the rod, to be incident upon the reflective surface 86.2 of the adjustably mounted mirror 86 as indicated in FIG. 7 by the arrowheaded lines 94b.

Since part of the light collimated by the lens 92 is directed perpendicular to the laser surface 22.1, the part of this light which is directed past the laser rod 22 will also extend in a direction perpendicular to the laser surface 22.2 and can therefore be considered as representative of the light output 84 of the laser means 12. Thus the mirror 86 can be adjusted to direct the light 94b upon the cornea of an eye 18 to be concentrated upon a selected fundus area by refractive media of the eye prior to actuation of the laser means 12. Then the laser means 12 can be fired in the manner previously described for emitting a burst of light 84 which will also be directed upon the eye 18 by the mirror 86 to effect photocoagulation of the selected fundus area. Since the mirror is partially-reflecting and partially-transmitting, the operator of the apparatus 82, diagrammatically indicated at 96, can view the fundus of the eye 18 by means of a conventional ophthalmoscope or the like indicated at 98 through the mirror 86 along the line of sight indicated by the broken lines 100. As can be seen, the embodiment of the apparatus provided by this invention is extremely compact and permits great freedom of observation of the fundus of the eye 18.

Although particular embodiments of the methods and apparatus provided by this invention have been described for the purpose of illustration, it should be understood that this invention includes all modifications and equivalents thereof which fall within the scope of the appended claims.

We claim:

1. Maser apparatus comprising optical maser means having a pair of plane, parallel, reflective opposite end surfaces, said optical maser means being actuable to emit high-intensity laser light from one of said surfaces in a single direction perpendicular to the plane of said one surface, alignment light source means, means mounted in said apparatus for projecting alignment light from said alignment light source means toward a selected one of said optical maser surfaces in a direction perpendicular to the plane of said selected surface so that part of said alignment light is transmitted in said single direction, and means for directing said part of said alignment light transmitted in said single direction along a selected path to a selected target prior to actuation of said optical maser means such that said optical maser means can thereafter be actuated to direct high-intensity laser light emitted from said optical maser means along said selected path to said selected target.

2. Maser apparatus comprising optical maser means having a pair of plane, parallel reflecting surfaces, said optical maser means being actuable to emit high-intensity laser light from one of said surfaces in a direction perpendicular to the plane of said surface, alignment light source means, means mounted in said apparatus for directing a collimated beam of alignment light from said alignment light source means upon said one plane surface of the optical maser means to be reflected therefrom in a direction perpendicular to the plane of said one surface, and means for directing said reflected beam of alignment light along a selected path to a selected target prior to actuation of said optical maser means such that said optical maser means can thereafter be actuated to direct high-intensity laser light emitted from said optical maser means along said selected path to said selected target.

3. A method for arranging an optical maser having a pair of plane, parallel, reflective opposite end surfaces, one of which is adapted to emit high-intensity laser light in a single direction perpendicular to the plane of said surface, so that high-intensity laser light output of the optical maser is directed along a predetermined path to a selected target, said method comprising the steps of projecting a beam of collimated alignment light toward one of said plane surfaces in a direction perpendicular to the plane thereof so that part of said alignment light is transmitted in said single direction, and directing part of said transmitted alignment light along said predetermined path such that high-intensity laser light output of the optical maser is subsequently directed along said predetermined path.

4. A method for arranging an optical maser having a plane reflective end surface from which the optical maser is actuable to emit high-intensity laser light so that the high-intensity laser light output of the maser is directed to a selected target, said method comprising the steps of projecting a substantially collimated beam of alignment light upon the plane surface of the maser which is adapted to emit high-intensity light so that the light directed upon said surface is reflected therefrom in a direction perpendicular to the plane of said surface, whereby said reflected light will correspond in direction to high-intensity laser light output of the maser, and directing said reflected light to said selected target thereby to indicate that subsequent high-intensity laser light output of the maser will be directed to said selected target.

5. Maser apparatus comprising optical maser means having a central axis and at least one end surface perpendicular thereto and being operable to emit high-intensity laser light from said one end surface along an optical axis which is perpendicular to the plane of said one end surface and is an extension of said maser means central axis, a light source in said apparatus, means mounted in said apparatus for projecting light from said light source toward said optical maser means, means for adjusting the direction of said projected light to be perpendicular to the plane of said one end surface so that at least a portion of said light is transmitted along said optical axis, means for directing at least a portion of said transmitted light along a selected path which is to be subsequently followed by the high-intensity laser light when emitted from said optical maser means upon firing thereof, and means for firing said optical maser means to direct said high-intensity laser light along said selected path.

6. Maser apparatus in accordance with claim 5 wherein said one end surface is reflecting and the light projecting means comprises means for projecting said light toward said one end surface for reflection therefrom.

7. Maser apparatus in accordance with claim 5 wherein said maser means includes another end surface and the light projecting means comprises means for projecting said light against the other end surface so that a portion of said light is directed along and outside said optical maser means.

8. A method for arranging an optical maser having a central axis and at least one end surface perpendicular thereto and being operable to emit high-intensity laser light from said one end surface along an optical axis which is perpendicular to the plane of said one end surface and is an extension of said maser means central axis so that high-intensity laser light output of said optical maser is directed along a selected path comprising the steps of projecting light from a light source toward said optical maser, adjusting the direction of said projected light to be perpendicular to the plane of said one end surface so that at least a portion of said light is transmitted along said optical axis, directing at least a portion of said transmitted light along a selected path which is to be subsequently followed by the high-intensity laser light when emitted from said optical maser upon firing thereof, and firing said optical maser to direct said high-intensity laser light along said selected path.

9. A method for arranging an optical maser in accordance with claim 8 wherein said one end surface is reflecting and said step of projecting light from a light source comprises projecting light along said optical axis toward said one end surface for reflection therefrom.

10. A method for arranging an optical maser in accordance with claim 8 wherein said step of projecting light from a light source comprises projecting light along said optical axis toward a second of said end surfaces so that a portion of said light is directed along and outside said optical maser.

11. Apparatus for aiming the high-intensity light output from an optical maser toward a selected target comprising an optical maser having a central axis and two end surfaces and being operable to emit high-intensity laser light from one of said end surfaces along an optical axis which is perpendicular to said one end surface and is an extension of said optical maser central axis, a low-intensity light source, means mounted in said apparatus for projecting low-intensity light from said low-intensity light source toward said optical maser, means for adjusting the direction of said projected low-intensity light to be perpendicular to said one end surface so that at least a portion of said low-intensity light is transmitted along said optical axis, means for aiming at least a portion of said transmitted light, after it has been transmitted along said optical axis, toward said selected target along a path which is to be subsequently followed by the high-intensity laser light emitted from said optical maser upon firing thereof, and means for firing said optical maser to direct said high intensity laser light toward said selected target along said path.

12. Apparatus in accordance with claim 11 wherein said one end surface is reflecting and the light projecting means comprises means for projecting said low-intensity light toward said one end surface for reflection therefrom.

13. Apparatus in accordance with claim 11 wherein the light projecting means comprises means for projecting low-intensity light against the other of said end surfaces so that a portion of said light is directed along and outside said optical maser.

14. Apparatus in accordance with claim 11 wherein said aiming means includes a partially-transmitting partially-reflecting mirror adapted for high reflectance of light of the wavelength emitted by said optical maser.

15. A method for aiming the high-intensity laser light output from an optical maser toward a selected target, said optical maser having a central axis and two end surfaces and being operable to emit high-intensity laser light from one of said surfaces along an optical axis which is perpendicular to said one end surface and is an extension of said optical maser central axis, comprising the steps of projecting low-intensity light to be perpendicular to said one end surface so that at least a portion of said low-intensity light is transmitted along said optical axis, aiming at least a portion of said transmitted low-intensity light, after it has been transmitted along said optical axis, toward said selected target along a path which is subsequently to be followed by the high-intensity laser light emitted from said optical maser upon firing thereof, and firing said optical maser to direct said high-intensity laser light toward said selected target along said path.

16. A method for aiming the high-intensity laser light output from an optical maser in accordance with claim 5 wherein said one end surface is reflecting and said step of projecting low-intensity light comprises projecting said low intensity light toward said one end surface for reflection therefrom.

17. A method for aiming the high-intensity laser light output from an optical maser in accordance with claim 15 wherein said step of projecting low-intensity light comprises projecting said low intensity light against the other of said end surfaces so that a portion of said low-intensity light is directed along and outside said optical maser.

18. A method for aiming the high-intensity laser light output from an optical maser in accordance with claim 15 wherein said step of aiming comprises aiming said portion of low-intensity light toward said selected target by reflecting the low-intensity light transmitted along said single direction toward said selected target.

UNITED STATES PATENT OFFICE
CERTIFICATE OF CORRECTION

Patent No. 3,571,748           Dated  Mar. 23, 1971

Inventor(s) Charles J. Koester et al.

It is certified that error appears in the above-identified patent and that said Letters Patent are hereby corrected as shown below:

On the cover sheet insert -- [73] Assignee. American Optical Corporation, Southbridge, Mass., a corporation of Delaware --; same cover sheet [45] "265,033" should read -- 256,033 --.

Signed and sealed this 18th day of April 1972.

(SEAL)
Attest:

EDWARD M. FLETCHER, JR.                ROBERT GOTTSCHALK
Attesting Officer                       Commissioner of Paten